(12) United States Patent
Ito et al.

(10) Patent No.: US 8,890,820 B2
(45) Date of Patent: Nov. 18, 2014

(54) TOUCH PANEL APPARATUS, CONTROL APPARATUS AND CONTROL METHOD

(75) Inventors: Satoshi Ito, Kawasaki (JP); Susumu Kubota, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 127 days.

(21) Appl. No.: 13/298,428

(22) Filed: Nov. 17, 2011

(65) Prior Publication Data

US 2012/0127125 A1 May 24, 2012

(30) Foreign Application Priority Data

Nov. 19, 2010 (JP) ................................ 2010-259170
Nov. 2, 2011 (JP) ................................ 2011-241056

(51) Int. Cl.
G09G 5/00 (2006.01)
G06F 3/041 (2006.01)
G06F 3/045 (2006.01)

(52) U.S. Cl.
CPC .............. *G06F 3/045* (2013.01); *G06F 3/0416* (2013.01)
USPC ........ 345/173; 345/174; 345/178; 178/18.01; 178/18.08

(58) Field of Classification Search
USPC ...................... 345/173–178; 178/18.01–18.06
See application file for complete search history.

(56) References Cited

U.S. PATENT DOCUMENTS

| 6,255,604 | B1 | 7/2001 | Tokioka et al. | |
|---|---|---|---|---|
| 2009/0189877 | A1* | 7/2009 | Washino et al. | 345/174 |
| 2009/0322701 | A1 | 12/2009 | D'Souza et al. | |
| 2010/0214231 | A1 | 8/2010 | D'Souza et al. | |
| 2010/0277417 | A1 | 11/2010 | Sarasmo | |
| 2011/0025642 | A1 | 2/2011 | Tada et al. | |
| 2011/0043462 | A1* | 2/2011 | Shabra et al. | 345/173 |
| 2011/0279404 | A1 | 11/2011 | Tada | |
| 2012/0001866 | A1* | 1/2012 | Rapakko | 345/174 |
| 2012/0032893 | A1* | 2/2012 | Calpe Maravilla et al. | 345/173 |

FOREIGN PATENT DOCUMENTS

| CN | 1143771 A | 2/1997 |
|---|---|---|
| CN | 101493744 A | 7/2009 |
| JP | 08-241161 | 9/1996 |
| JP | 2003-280816 A | 10/2003 |
| JP | 2009-176114 | 8/2009 |

(Continued)

OTHER PUBLICATIONS

Taiwanese Office Action issued on Jan. 14, 2014 in corresponding Taiwanese Application No. 100142334, along with English translation.

(Continued)

*Primary Examiner* — Jennifer Nguyen
(74) *Attorney, Agent, or Firm* — White & Case LLP (57) ABSTRACT

According to an embodiment, a control apparatus controls a touch panel includes a first resistive film includes a first terminal and a second terminal and a second resistive film includes a third terminal and a fourth terminal, the first and second resistive films being laid on top of each other with a gap between the resistive films. The control apparatus comprises an application unit, a measurement unit and a calculation unit. The application unit is configured to apply a voltage between the first terminal and the second terminal at a first timing. The measurement unit is configured to measure a voltage of each of the third and fourth terminals at the first timing. The calculation unit is configured to derive a positional relationship between two points at which the touch panel has been touched based on the voltages of the third and fourth terminals measured at the first timing.

11 Claims, 5 Drawing Sheets

(56) References Cited

FOREIGN PATENT DOCUMENTS

| | | |
|---|---|---|
| JP | 2011-076591 | 4/2011 |
| JP | 2011216001 A | 10/2011 |
| KR | 10-2009-0082142 | 7/2009 |
| TW | 200937272 A | 9/2009 |
| TW | 201011623 A | 3/2010 |
| TW | 201035845 A | 10/2010 |

OTHER PUBLICATIONS

Korean Office Action issued on Oct. 30, 2013 in corresponding Korean Application No. 10-2011-0120769, along with English translation.

Chinese Office Action mailed on Mar. 5, 2014 in corresponding Chinese Application No. 201110371016.X, along with English translation.

Korean Office Action mailed on May 22, 2014 in corresponding Korean Application No. 10-2011-0120769, along with English translation thereof.

Taiwanese Office Action issued on Jul. 31, 2014 in corresponding Taiwanese Application No. 100142334, along with English translation thereof.

Japanese Office Action issued on Oct. 7, 2014 in corresponding Japanese Application No. 2011-241056, along with English translation thereof.

* cited by examiner

TOUCH PANEL APPARATUS, CONTROL APPARATUS AND CONTROL METHOD

CROSS-REFERENCE TO RELATED APPLICATIONS

This application is based upon and claims the benefit of priority from prior Japanese Patent Application No. 2010-259170, filed Nov. 19, 2010, the entire contents of which are incorporated herein by reference.

FIELD

Embodiments described herein relate generally to a resistive touch panel.

BACKGROUND

A touch panel is known which comprises two resistive films laid on top of each other with a gap between the films. Each of the resistive films comprises terminals on the respective opposite end sides thereof. The two resistive films overlap so that the terminals of one of the films are orthogonal to the terminals of the other film. When a user's touch allows the resistive films to come into contact with each other, terminal voltages change. Based on these terminal voltages, the input coordinates of the single point at which the touch panel has been touched can be calculated.

Furthermore, when the panel is touched at two points, the resistance between the terminals decreases. Thus, whether the panel is touched at one or two points can be determined based on the change in resistance. Moreover, if the panel is determined to be touched at two points, the distance between the two points can be calculated based on the change in resistance.

On the other hand, no technique has been known which allows calculation of the input coordinates of two points at which a resistive touch panel is touched. The calculated input, coordinates of the two points can be utilized as significant input information.

DETAILED DESCRIPTION

Embodiments will be described below with reference to the drawings.

In general, according to an embodiment, a control apparatus controls a touch panel comprising a first resistive film comprising a first terminal and a second terminal on respective opposite end sides and a second resistive film comprising a third terminal and a fourth terminal on respective opposite end sides which are orthogonal to the opposite end sides of the first resistive film, the first and second resistive films being laid on top of each other with a gap between the resistive films in such a manner that the resistive films come into contact with each other at a point at which the touch panel has been touched. The control apparatus comprises an application unit, a measurement unit and a calculation unit. The application unit is configured to apply a voltage between the first terminal and the second terminal at a first timing. The measurement unit is configured to measure a voltage of each of the third and fourth terminals at the first timing. The calculation unit is configured to derive a positional relationship between two points at which the touch panel has been touched based on the voltages of the third and fourth terminals measured at the first timing.

First Embodiment

Figure 7:
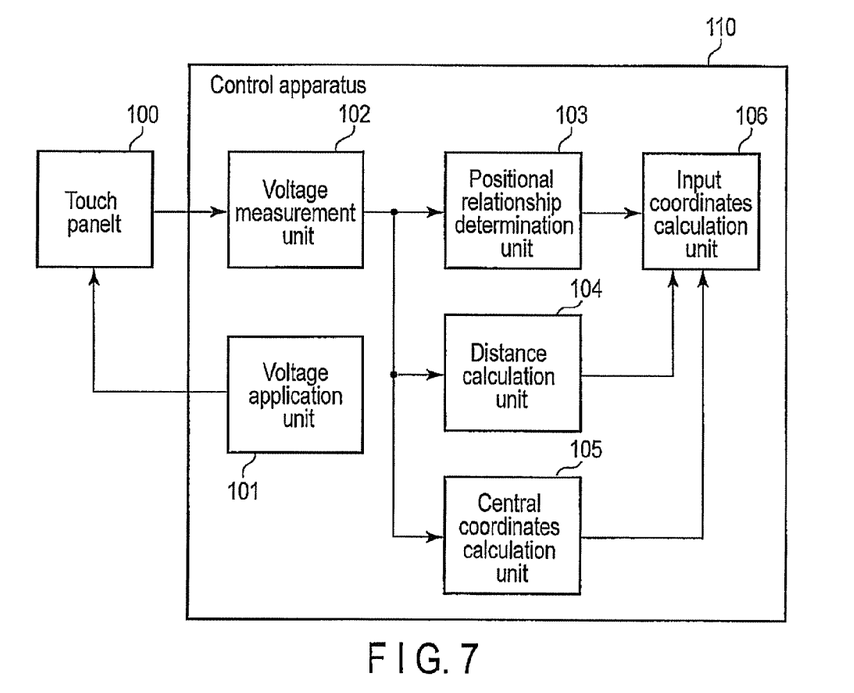
FIG. 7 is a block diagram illustrating the touch panel apparatus according to the first embodiment.

As shown in FIG. 7, a 4-wire resistive touch panel apparatus according to a first embodiment includes a touch panel 100 and a control apparatus 110. The control apparatus 110 includes a voltage application unit 101, a voltage measurement unit 102, a positional relationship determination unit 103, a distance calculation unit 104, a central coordinates calculation unit 105, and an input coordinates calculation unit 106. The positional relationship determination unit 103, the distance calculation unit 104, the central coordinates calculation unit 105, and the input coordinates calculation unit 106 can be partly or wholly considered to be an integrated calculation unit. The touch panel apparatus according to the present embodiment can be used as, for example, an input device for any of various information processing apparatuses such as a point-of-sale (POS) system terminal and a personal computer.

The control apparatus 110 can be partly or wholly implemented as a semiconductor device (for example, a microcontroller or a logic circuit). The control apparatus 110 provides functions to control the touch panel 100, including one to detect the input coordinates of two points.

Figure 1:
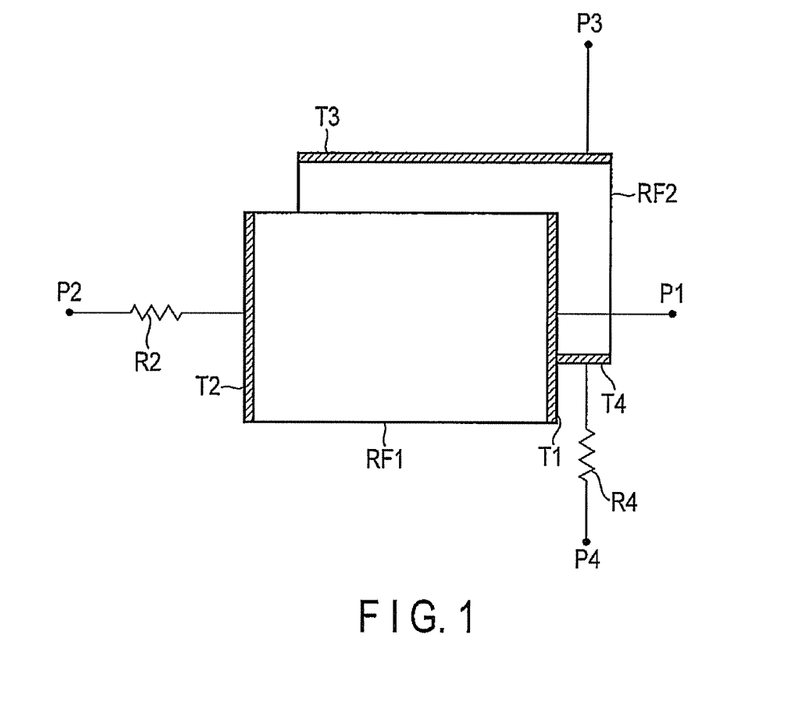
FIG. 1 is a diagram illustrating a resistive touch panel.

An example of the touch panel 100 is shown in FIG. 1. The touch panel 100 comprises two resistive films RF1 and RF2 laid on top of each other with a gap between films RF1 and RF2. Resistive film RF1 comprises terminals T1 and T2 on the respective opposite end sides thereof. Resistive film RF2 comprises terminals T3 and T4 on the respective opposite end sides thereof. The two resistive films RF1 and RF2 overlap so that terminals T1 and T2 cross terminals T3 and T4. In the description below, for simplification, an x-axis is defined in a direction orthogonal to terminals T1 and T2. A y-axis is defined in a direction orthogonal to terminals T3 and T4. Moreover, an x-coordinate value is defined to increase as the x-coordinate goes from terminal T2 toward terminal T1. A y-coordinate value is defined to increase as the y-coordinate goes from terminal T4 toward terminal T3.

Terminals T1 and T3 are connected to nodes P1 and P3, respectively, for voltage application. Terminals T2 and T4 are connected to nodes P2 and P4 via resistors R2 and R4, respectively, for voltage application. Resistors R2 and R4 have known resistances. As described below, the voltage application unit 101 can apply a voltage between nodes P1 and P2 and between nodes P3 and P4. Furthermore, the voltage measurement unit 102 can measure the voltages of terminals T1, T2, T3, and T4 at predetermined timings.

Figure 2:
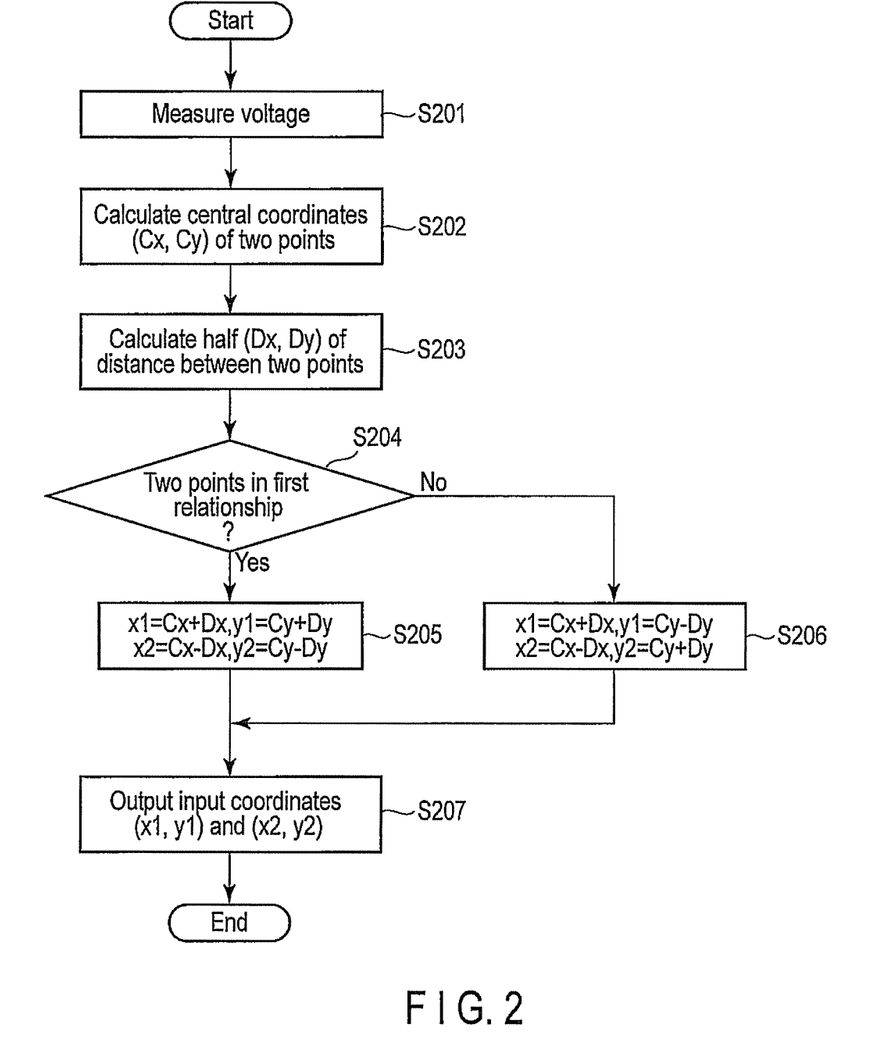
FIG. 2 is a flowchart illustrating an operation of a touch panel apparatus according to a first embodiment.

An example of operation of the touch panel apparatus in FIG. 7 will be described below with reference to FIG. 2.

When processing starts, the voltage application unit 101 applies a voltage to the touch panel 100. The voltage measurement unit 102 measures the voltage of each of the terminals in the touch panel when the voltage is applied to the touch panel 100 (step S201). Specifically, the voltage application unit 101 applies a voltage Vcc between nodes P1 and P2 at a first timing. The voltage application unit 101 applies voltage Vcc between nodes P3 and P4 at a second timing. That is, at the first timing, node P1 is connected to a stationary DC power source. Node P2 is connected to ground. Nodes P3 and P4 form open ends. On the other hand, at the second timing, node P3 is connected to the stationary DC power source. Node P4 is connected to ground. Nodes P1 and P2 form open ends.

At the first timing, the voltage measurement unit 102 measures voltage V12 (T2) of terminal T2, voltage V12 (T3) of terminal T3, and voltage V12 (T4) of terminal T4. Voltage V12 (T1) of terminal T1 theoretically equals Vcc and thus need not be measured.

However, if a resistor R1 (not shown in the drawings) with a known resistance is interposed between terminal T1 and node P1, voltage V12 (T1) of terminal T1 at the first timing may vary. Thus, voltage V12 (T1) may be measured at the first timing. According to the present embodiment, the input coordinates of two points can be calculated by utilizing one of voltages V12 (T1) and V12 (T2). However, measurement of both voltages is expected to reduce measurement errors as a result of an increase in the number of measurements.

At the second timing, the voltage measurement unit 102 measures voltage V34 (T1) of terminal T1, voltage V34 (T2) of terminal T2, and voltage V34 (T4) of terminal T4. Voltage V34 (T3) of terminal T3 theoretically equals Vcc and thus need not be measured. However, of course, as is the case with the above-described terminal T1, a resistor R3 (not shown in the drawings) with a known resistance may be interposed between terminal T3 and node P3, and voltage V34 (T3) at the second timing may be measured.

The voltage measurement unit 102 inputs the results of measurements of the terminal voltages at the first and second timings to each of the positional relationship determination unit 103, the distance calculation unit 104, and the central coordinates calculation unit 105.

In step S202, the central coordinates calculation unit 105 calculates the central coordinates (Cx, Cy) of input coordinates of two points based on the terminal voltages measured in step S201. Here, when the input coordinates of two points are denoted as (x1, y1) and (x2, y2), Relational Expression (1) holds true for the central coordinates (Cx, Cy) as follows.

$$Cx = \frac{x1 + x2}{2} \quad (1)$$

$$Cy = \frac{y1 + y2}{2}$$

Now, as an introduction to description of a method for calculating the central coordinates (Cx, Cy) of two points, a technique will be described which is used to calculate the coordinates of one point at which the touch panel is touched, that is, an input point P0.

Figure 4:
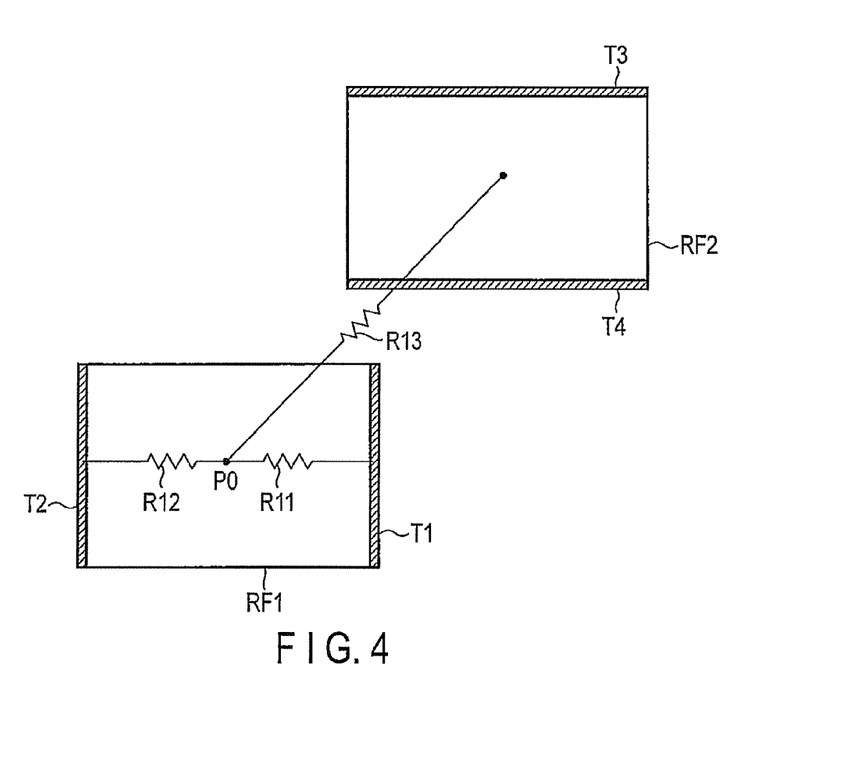
FIG. 4 is a diagram illustrating an equivalent circuit of a touch panel for a one-point input.

When the touch panel 100 is touched at the input point P0, resistive films RF1 and RF2 come into contact with each other. The touch panel 100 touched at the input point P0 can be expressed by an equivalent circuit including resistors R11, R12, and R13 as shown in FIG. 4. It is assumed that the above-described resistor R2 is neglected and that voltage Vcc is applied between terminals T1 and T2 at the first timing. In this case, the voltage at the input point P0 is determined by the voltage ratio of resistances R11 and R12, that is, Vcc×R12/(R11+R12). For simplification, in the description below, the resistance of resistor RX (X is any reference number) is denoted as RX. Resistance R11 increases in proportion to the distance from terminal T1 to the input point P0. Resistance R12 increases in proportion to the distance from the input point P0 to terminal T2. That is, the x-coordinate of the input point P0 can be calculated based on the voltage at the input point P0.

The voltage at the input point P0 is applied to one end of resistor R13. However, at the first timing, both terminals T3 and T4 form open ends. Furthermore, a sufficiently large impedance is connected to the terminals by the voltage measurement unit 102 for voltage measurement. Thus, at the first timing, almost no current flows through resistor R13. Hence, the resultant voltage drop is negligible. That is, at the first timing, the voltage at the input point P0 is substantially equal to each of voltage V12 (T3) of terminal T3 and voltage V12 (T4) of terminal T4. As described above, the x-coordinate of the input point P0 can be calculated from voltage V12 (T3) or voltage V12 (T4). Similarly, the y-coordinate of the input point P0 can be calculated from voltage V34 (T1) of terminal T1 and voltage V34 (T2) of terminal T2 at the second timing.

Now, step S202 will be described in detail. The x-coordinate of the central coordinates (Cx, Cy) can be calculated from voltage V12 (T3) of terminal T3 and voltage V12 (T4) of terminal T4 at the first timing. Specifically, for a two-point touch, voltage V12 (T3) of terminal T3 can be determined from the distance from input coordinates (x1, y1) to terminal T3 and the distance from input coordinates (x2, y2) to terminal T3. Similarly, voltage V12 (T4) of terminal T4 can be determined from the distance from input coordinates (x1, y1) to terminal T4 and the distance from input coordinates (x2, y2) to terminal T4. The technique to derive voltage V12 (T3) and voltage V12 (T4) will be described below in detail.

For example, it is assumed that input coordinates (x1, y1) are close to terminal T3 and that input coordinates (x2, y2) are close to terminal T4. In this case, voltage V12 (T3) of terminal T3 is close to the voltage at input coordinates (x1, y1) (the voltage at input coordinates (x1, y1) is hereinafter referred to as V12 (Px1)). On the other hand, voltage V12 (T4) of terminal T4 is close to the voltage at input coordinates (x2, y2) (the voltage at input coordinates (x2, y2) is hereinafter referred to as V12 (Px2)). Hence, Relational Expression (2) shown below holds true. In Relational Expression (2), ABS (α) denotes a function that returns the absolute value of α. Furthermore, if input coordinates (x1, y1) are close to terminal T4 and input coordinates (x2, y2) are close to terminal T3, the inequality sign of the following relational expression is reversed.

ABS{V12(T3)−V12(Px1)}<ABS{V12(T3)−V12(Px2)}

ABS{V12(T4)−V12(Px2)}<ABS{V12(T4)−V12(Px1)} (2)

For y1=y2, each of voltages V12 (T3) and V12 (T4) is substantially equal to the average of the voltage at input coordinates (x1, y1) and the voltage at input coordinates (x2, y2), that is, the voltage at the central coordinates (Cx, Cy).

Cx can be calculated by utilizing the average of voltage V12 (T3) and voltage V12 (T4) as the voltage at the central coordinates (Cx, Cy). Similarly, Cy can be calculated by utilizing the average of voltage V34 (T1) and voltage V34 (T2) as the voltage at the central coordinates (Cx, Cy). In implementation, the sum of the voltages may be simply calculated instead of the average of the voltage. Calculation of the sum instead of the average is expected to reduce calculation costs as a result of omission of a division.

In step S203, the distance calculation unit 104 calculates half (Dx, Dy) of the distance between the input coordinates of two points based on the terminal voltages measured in step S201. Here, Dx denotes an x-axis component of half of the distance, and Dy denotes a y-axis component of half of the distance. The following relational expression holds true for half of distance (Dx, Dy).

$$Dx = \frac{|x1 - x2|}{2} \qquad (3)$$

$$Dy = \frac{|y1 - y2|}{2}$$

Figure 5:
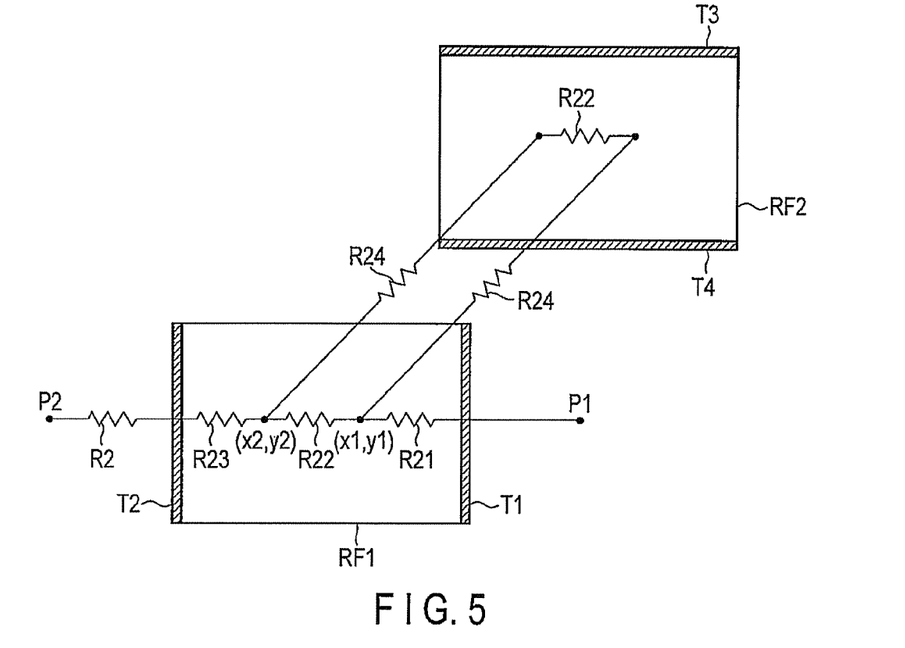
FIG. 5 is a diagram illustrating an equivalent circuit of the touch panel for a two-point input.

FIG. 5 shows an equivalent circuit of the touch panel 100 formed when the touch panel 100 is touched at two points. A parallel circuit is formed between input coordinates (x1, y1) and input coordinates (x2, y2). A resistance Z22 for the parallel circuit can be calculated based on:

$$Z22 = \frac{R22 + 2R24}{2R22 + 2R24} \times R22 \qquad (4)$$

On the other hand, when no two-point touch is carried out, the resistance between coordinates (x1, y1) and coordinates (x2, y2) is equal to R22. That is, the decrease in resistance resulting from a two-point touch can be calculated by:

$$R22 - Z22 = \frac{R22}{2} \times \frac{R22}{R22 + R24} \qquad (5)$$

As is apparent from Expression (5), the decrease in resistance resulting from a two-point touch increases monotonically consistently with resistance R22. Resistance R22 increases in proportion to the distance between coordinates (x1, y1) and coordinates (x2, y2). Furthermore, at the first timing, voltage V12 (T2) of terminal T2 is determined by the voltage ratio of resistance R2 to the resistance between terminals T1 and T2 (that is, R21+Z22+R23). As described above, the resistance between terminals T1 and T2 decreases with increasing distance between input coordinates (x1, y1) and input coordinates (x2, y2). That is, voltage V12 (T2) of terminal T2 increases monotonically consistently with the above-described distance. Thus, the corresponding Dx can be calculated by providing an appropriate monotonic increase function and substituting voltage V12 (T2) into the function. Similarly, Dy can be calculated by utilizing the tendency of voltage V34 (T4) to increase monotonically consistently with the distance between the two points.

Furthermore, instead of the function, a table indicative of input/output relationships for the function may be utilized. Moreover, instead of calculation of the (Dx, Dy) proper, multiplication of (Dx, Dy) by a constant (for example, Dx×2=the x-axis-directional component of the distance between the two points, and Dy×2=the y-axis-directional component of the distance between the two points) may be carried out. If resistor R1 is interposed between terminal T1 and node P1, voltage V12 (T1) of terminal T1 decreases monotonically consistently with increasing distance described above. Thus, Dx can also be calculated by utilizing this tendency. Furthermore, if resistor R3 is interposed between terminal T3 and node P3, voltage V34 (T3) of terminal T3 decreases monotonically consistently with increasing distance described above. Thus, Dy can also be calculated by utilizing this tendency. Moreover, when half of the distance or the like is calculated, instead of the measured terminal voltage proper, for example, the resistance between the terminals calculated based on the terminal voltage may be utilized.

According to Relational Expressions (1) and (3) described above, input coordinates (x1, y1) and (x2, y2) satisfy one of Relational Expressions (6) and (7) shown below.

$$(x1,y1)=(Cx+Dx,Cy+Dy)$$

$$(x2,y2)=(Cx-Dx,Cy-Dy) \qquad (6)$$

$$(x1,y1)=(Cx+Dx,Cy-Dy)$$

$$(x2,y2)=(Cx-Dx,Cy+Dy) \qquad (7)$$

In Relational Expressions (6) and (7), x1≥x2 is defined. However, even with a different definition, the input coordinates of the two points can be calculated by appropriately interpreting the description below. Furthermore, if the definition of the axial direction, the direction in which a voltage is applied, or the like is changed, the input coordinates of the two points can be calculated by appropriately interpreting the description below.

Figure 3:
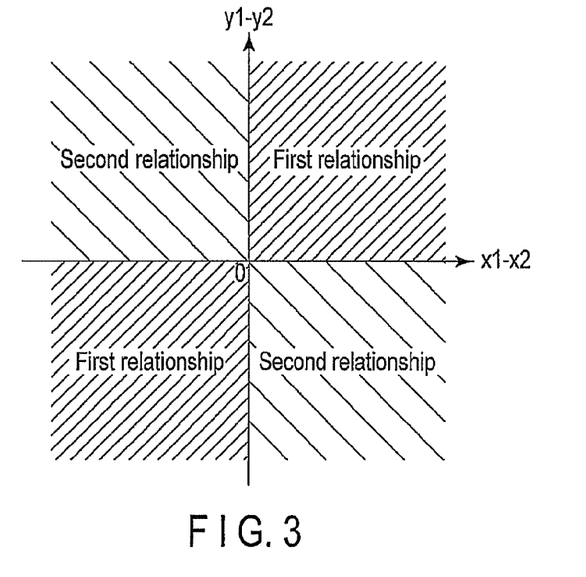
FIG. 3 is a diagram illustrating a first relationship and a second relationship.

In step S204, the positional relationship determination unit 103 derives the relative positional relationship between the two input points. In the description below, for simplification, the above-described positional relationship is classified into a first relationship and a second relationship. The first and second relationships are illustrated in FIG. 3.

Figure 6A:
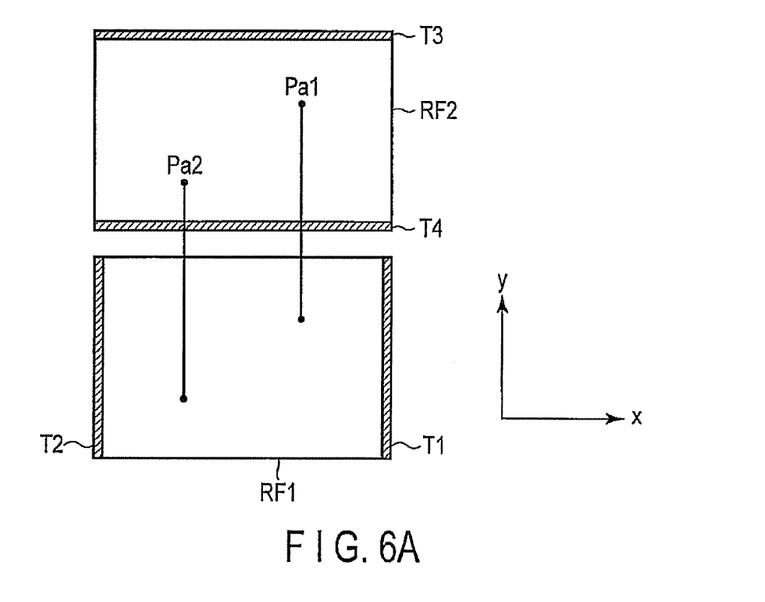
FIG. 6A is a diagram illustrating two points in the first relationship.
Figure 6B:
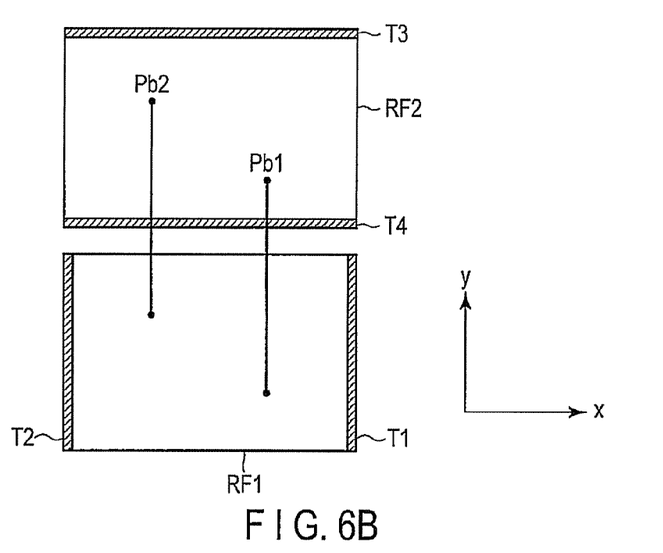
FIG. 6B is a diagram illustrating two points in the second relationship.

The first relationship corresponds to the case where the sign of the difference in x-coordinate x1−x2 is identical to that of the difference in y-coordinate y1−y2. In this case, the two input points satisfies Relational Expression (6) described above. In other words, if a straight line joining the two input points together slopes upwards when going from left to right, the input points are in the first relationship. For example, input points Pa1 and Pa2 shown in FIG. 6A are in the first relationship. The second relationship corresponds to the case where the sign of the difference in x-coordinate x1−x2 is different from that of the difference in y-coordinate y1−y2. In this case, the two input points satisfies Relational Expression (7) described above. For example, input points Pb1 and Pb2 shown in FIG. 6B are in the second relationship. In other words, if a straight line joining the two input points together slopes downwards when going from left to right, the input points are in the second relationship.

For x1−x2=0, Dx=0. For y1−y2=0, Dy=0. Thus, given that Dx=0 or Dy=0, the input coordinates can be uniquely calculated based on Relational Expression (6) or (7) regardless of whether the positional relationship between the two input points is considered to be the first or second relationship. In the description below, for simplification, x1≠x2 and y1≠y2 unless otherwise specified.

The technique to derive the positional relationship will be specifically described.

When the two input points are in the first relationship, y1 is larger than y2 as shown in FIG. 6A. In other words, (x1, y1) is close to terminal T3, and (x2, y2) is close to terminal T4. Thus, at the first timing, voltage V12 (T3) of terminal T3 is relatively significantly affected by the voltage at (x1, y1). On the other hand, voltage V12 (T4) of terminal T4 is relatively significantly affected by the voltage at (x2, y2). Here, since x1>x2, the voltage at (x1, y1) is higher than that at (x2, y2).

That is, when the two input points are in the first relationship, voltage V12 (T3) of terminal T3 is higher than voltage V12 (T4) of terminal T4.

On the other hand, when the two input points are in the second relationship, y1 is smaller than y2 as shown in FIG. 6B. In other words, (x1, y1) is close to terminal T4, and (x2, y2) is close to terminal T3. Thus, at the first timing, voltage V12 (T3) of terminal T3 is relatively significantly affected by the voltage at (x2, y2). On the other hand, voltage V12 (T4) of terminal T4 is relatively significantly affected by the voltage at (x1, y1). Here, since x1>x2, the voltage at (x1, y1) is higher than that at (x2, y2). That is, when the two input points are in the second relationship, voltage V12 (T3) of terminal T3 is lower than voltage V12 (T4) of terminal T4.

Expressions will be used to describe below in detail how the positional relationship between the two input points can be derived based on the magnitude relationship between voltage V12 (T3) of terminal T3 and voltage V12 (T4) of terminal T4.

First, since it is assumed that x1>x2, (x1, y1) is close to terminal T1 and (x2, y2) is close to terminal T2 regardless of whether the two input points are in the first or second relationship. Evidently, voltage V12 (T1)>voltage V12 (T2). Thus, also evidently, V12 (Px1)>V12 (Px2). Furthermore, terminals T3 and T4 are open ends. A sufficiently large impedance (hereinafter denoted as Z) is connected to the terminals by the voltage measurement unit 102 in order to measure voltages V12 (T3) and V12 (T4). Consequently, the voltage drop between input coordinates (x1, y1) and each of terminals T3 and T4 is smaller than that between input coordinates (x1, y1) and input coordinates (x2, y2). Therefore, V12 (Px1)>V12 (T3)>V12 (Px2) holds true, and V12 (Px1)>V12 (T4)>V12 (Px2) also holds true. However, the magnitude relationship between voltages V12 (T3) and V12 (T4) cannot be derived directly from these relational expressions.

Thus, voltages V12 (T3) and V12 (T4) need to be derived in detail. Here, the resistance between input coordinates (x1, y1) and terminal T3 is denoted as r1. The resistance between input coordinates (x2, y2) and terminal T3 is denoted as r2. Since Z>>r1 and Z>>r2, voltage V12 (T3) can be approximated by a voltage obtained by internally dividing voltage V12 (Px1) and voltage V12 (Px2) by resistances r1 and r2 as indicated by:

$$V12(T3) \approx \frac{r2 \cdot V12(P \times 1) + r1 \cdot V12(P \times 2)}{r1 + r2} \quad (8)$$

Thus, the difference between voltages V12 (Px1) and V12 (T3) and the difference between voltages V12 (Px2) and V12 (T3) can be approximated by:

$$V12(P \times 1) - V12(T3) \approx \frac{r1}{r1 + r2}(V12(P \times 1) - V12(P \times 2)) \quad (9)$$

$$V12(T3) - V12(P \times 2) \approx \frac{r2}{r1 + r2}(V12(P \times 1) - V12(P \times 2))$$

Assuming that the two input points are in the first relationship, input coordinates (x1, y1) is closer to terminal T3 than input coordinates (x2, y2). Thus, evidently, r1<r2. Hence, {V12 (Px1)−V12 (T3)}<{V12 (T3)−V12 (Px2)} holds true. This indicates that voltage V12 (T3) has a value closer to voltage V12 (Px1) than to voltage V12 (Px2). A similar calculation indicates that voltage V12 (T4) has a value closer to voltage V12 (Px2) than to voltage V12 (Px1). Therefore, given that the two input points are in the first relationship, V12 (Px1)>V12 (T3)>V12 (T4)>V12 (Px2) holds true. On the other hand, given that the two input points are in the second relationship, r1>r2 holds true in the description above. Thus, V12 (Px1)>V12 (T4)>V12 (T3)>V12 (Px2) holds true.

As described above, the positional relationship determination unit 103 can derive the positional relationship between the two input points based on the comparison of voltage V12 (T3) of terminal T3 and voltage V12 (T4) of terminal T4 which are measured at the first timing. The positional relationship determination unit 103 can derive the positional relationship between the two input points based on a comparison of other voltages.

For example, since x1>x2 based on the above-described definitions, (x1, y1) is close to terminal T1, and the (x2, y2) is close to terminal T2. Thus, at the second timing, voltage V34 (T1) of terminal T1 is relatively significantly affected by the voltage at (x1, y1). On the other hand, voltage V34 (T2) of terminal T2 is relatively significantly affected by the voltage at (x2, y2). When the two input points are in the first relationship, y1>y2. Hence, the voltage at (x1, y1) is higher than that at (x2, y2). That is, voltage V34 (T1) of terminal T1 is higher than voltage V34 (T2) of terminal T2. On the other hand, when the two input points are in the second relationship, y1<y2. Thus, the voltage at (x1, y1) is lower than that at (x2, y2). That is, voltage V34 (T1) of terminal T1 is lower than voltage V34 (T2) of terminal T2. As described above, the positional relationship determination unit 103 can derive the positional relationship between the two input points based on the comparison of voltage V34 (T1) of terminal T1 and voltage V34 (T2) of terminal T2 which are measured at the second timing.

In step S204, when the positional relationship determination unit 103 determines that the two input points are in the first relationship, the processing proceeds to step S205. Otherwise the processing proceeds to step S206. As described above, in the present example, the positional relationship is classified into the first relationship and the second relationship. Under this precondition, the two input points not in the first relationship is synonymous with the two input points in the second relationship. Furthermore, steps S202, S203, and S204 have no dependency relationship and may thus be carried in an order different from that illustrated in FIG. 2.

In step S205, the input coordinates calculation unit 106 calculates input coordinates (x1, y1) and (x2, y2) according to Relational Expression (6) described above. The processing then proceeds to step S207. In step S206, the input coordinates calculation unit 106 calculates input coordinates (x1, y1) and (x2, y2) according to Relational Expression (7) described above. The processing then proceeds to step S207.

In step S207, input coordinates (x1, y1) and (x2, y2) calculated in step S205 or S206 are output, and the processing ends. In the present example, the input coordinates are calculated on the assumption that the touch panel is touched at two points. However, the touch panel may actually be touched at one point. Thus, if in step S207, the magnitude of the distance between the two points is smaller than a predetermined threshold, the touch panel may be determined to be touched at one point. If the touch panel is determined to be touched at one point, the input coordinates calculation unit 106 may output (Cx, Cy), (x1, x2), (x2, y2), or the like as input coordinates. Furthermore, this determination can also be achieved using (Dx, Dy) calculated in step S203 and may thus be made at any subsequent timing. Alternatively, the case where the touch panel is touched at one point may be defined as a third relationship, and the contents of the processing in FIG. 2 may be partly modified.

As described above, the touch panel apparatus according to the first embodiment, derives the positional relationship between two input points based on the voltages of the terminals provided on the respective end sides of each of the resistive films. The touch panel apparatus then performs arithmetic operations corresponding to the derived positional relationship to calculate the coordinates of the two input points. Thus, the present embodiment provides a resistive touch panel apparatus that enables the input coordinates of the two points to be utilized as significant input information. For example, an operation of inputting characters can be performed with a character type changed, by activating an appropriate lock key displayed on the touch panel and entering any character keys.

Second Embodiment

A touch panel apparatus normally holds the history of past input coordinates. A touch panel apparatus according to a second embodiment effectively utilizes the history of past input coordinates to calculate the coordinates of two input points.

When consecutive inputs are provided such that one of two points is substantially fixed, with the other point moved, the touch panel apparatus according to the present embodiment uses a technique different from that according to the first embodiment to calculate the input coordinates of the two points. Specifically, the touch panel apparatus references the history of the past input coordinates to determine whether or not one of the two input points is substantially fixed. For example, the last plural sets of input coordinates are referenced. Then, if the range of a variation in the coordinates of a point of interest is smaller than a predetermined threshold, this input point can be determined to be substantially fixed. If the input point is not fixed, the coordinates of the two input points can be calculated by application of the first embodiment. In contrast, if one of the input points is fixed at, for example, (s, t), the touch panel apparatus according to the present embodiment utilizes Expression (10) shown below to calculate coordinates (x2, y2) of the other input point. In Expression (10), sign(x) denotes a function that returns 1 for a nonnegative value of x or −1 for a negative value of x.

$$(x1, y1) = (s, t)$$

$$(x2, y2) = (s + \text{sign}(Cx-s) \times 2 \times Dx, t + \text{sign}(Cy-s) \times 2 \times Dy) \quad (10)$$

Moreover, if the distance between the calculated coordinates (x2, y2) and coordinates (s, t) of the fixed input point is smaller than a threshold, the touch panel apparatus can determine that the touch panel has been touched at one point. If the touch panel is determined to be touched at one point, (s, t), (Cx, Cy), (x2, y2), or the like may be output as the input coordinates of the one point.

As described above, when consecutive inputs are provided such that one of two points is substantially fixed, with the other point moved, the touch panel apparatus according to the present embodiment uses the technique different from that according to the first embodiment to calculate the input coordinates of the two points. Thus, if such inputs are provided, the touch panel apparatus according to the present embodiment can easily calculate the coordinates of the two input points while omitting the process of determining the positional relationship.

The processing in the above-described embodiments can be implemented using a general-purpose computer as basic hardware. A program implementing the processing in each of the above-described embodiments may be stored in a computer readable storage medium for provision. The program is stored in the storage medium as a file in an installable or executable format. The storage medium is a magnetic disk, an optical disc (CD-ROM, CD-R, DVD, or the like), a magnetooptic disc (MO or the like), a semiconductor disk, or the like. That is, the storage medium may be in any format provided that a program can be stored in the storage medium and that a computer can read the program from the storage medium. Furthermore, the program implementing the processing in each of the above-described embodiments may be stored on a computer (server) connected to a network such as the Internet so as to be downloaded into a computer (client) via the network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A control apparatus which controls a touch panel comprising a first resistive film comprising a first terminal and a second terminal on respective opposite end sides and a second resistive film comprising a third terminal and a fourth terminal on respective opposite end sides which are orthogonal to the opposite end sides of the first resistive film, the first and second resistive films being laid on top of each other with a gap between the resistive films in such a manner that the resistive films come into contact with each other at a point at which the touch panel has been touched, the apparatus comprising:

an application unit configured to apply a voltage between the first terminal and the second terminal at a first timing;
a measurement unit configured to measure a voltage of each of the third and fourth terminals at the first timing; and
a calculation unit configured to derive a relative positional relationship between two points at which the touch panel has been touched based on the voltages of the third and fourth terminals measured at the first timing; wherein the relative positional relationship includes a first relationship in which a straight line joining coordinates of the two points slopes upwards when going from left to right and a second relationship in which the straight line joining the coordinates of the two points slopes downwards when going from left to right;

the calculation unit derives the relative positional relationship between the two points based on a magnitude relationship between the voltages of the third and fourth terminals measured at the first timing;

the application unit further applies a voltage between the third terminal and the fourth terminal at a second timing;

the measurement unit further measures the voltage of at least one of the first and second terminals at the first timing, and measures the voltage of at least one of the third and fourth terminals, the voltage of the first terminal, and the voltage of the second terminal at the second timing; and the calculation unit further calculates central coordinates of the two points and at least one of a first inter-coordinates distance between the two points and a second inter-coordinates distance between the central coordinates and each of the two points, based on the voltages of the terminals measured at the first and second timings, and calculates the coordinates of the two points based on the central coordinates of the two points, at least one of the first and second inter-coordinates distances, and the relative positional relationship between the two points.

2. The apparatus according to claim 1, wherein the calculation unit calculates the central coordinates based on the voltages of the third and fourth terminals measured at the first timing and the voltages of the first and second terminals measured at the second timing.

3. The apparatus according to claim 1, wherein the calculation unit calculates at least one of the first and second inter-coordinates distances based on at least one of the voltages of the first and second terminals measured at the first timing and at least one of the voltages of the third and fourth terminals measured at the second timing.

4. The apparatus according to claim 1, wherein the calculation unit outputs the central coordinates of the two points instead of the coordinates of the two points if at least one of the first and second inter-coordinates distances is smaller than a predetermined threshold.

5. A touch panel apparatus comprising:
a touch panel which comprises a first resistive film comprising a first terminal and a second terminal on respective opposite end sides and a second resistive film comprising a third terminal and a fourth terminal on respective opposite end sides which are orthogonal to the opposite end sides of the first resistive film, the first and second resistive films being laid on top of each other with a gap between the resistive films in such a manner that the resistive films come into contact with each other at a point at which the touch panel has been touched;
an application unit configured to apply a voltage between the first terminal and the second terminal at a first timing;
a measurement unit configured to measure a voltage of each of the third and fourth terminals at the first timing; and
a calculation unit configured to derive a relative positional relationship between two points at which the touch panel has been touched based on the voltages of the third and fourth terminals measured at the first timing; wherein
the relative positional relationship includes a first relationship in which a straight line joining coordinates of the two points slopes upwards when going from left to right and a second relationship in which the straight line joining the coordinates of the two points slopes downwards when going from left to right;
the calculation unit derives the relative positional relationship between the two points based on a magnitude relationship between the voltages of the third and fourth terminals measured at the first timing;
the application unit further applies a voltage between the third terminal and the fourth terminal at a second timing;
the measurement unit further measures the voltage of at least one of the first and second terminals at the first timing, and measures the voltage of at least one of the third and fourth terminals, the voltage of the first terminal, and the voltage of the second terminal at the second timing; and
the calculation unit further calculates central coordinates of the two points and at least one of a first inter-coordinates distance between the two points and a second inter-coordinates distance between the central coordinates and each of the two points, based on the voltages of the terminals measured at the first and second timings, and calculates the coordinates of the two points based on the central coordinates of the two points, at least one of the first and second inter-coordinates distances, and the relative positional relationship between the two points.

6. The apparatus according to claim 5, wherein the calculation unit calculates the central coordinates based on the voltages of the third and fourth terminals measured at the first timing and the voltages of the first and second terminals measured at the second timing.

7. The apparatus according to claim 5, wherein the calculation unit calculates at least one of the first and second inter-coordinates distances based on at least one of the voltages of the first and second terminals measured at the first timing and at least one of the voltages of the third and fourth terminals measured at the second timing.

8. The apparatus according to claim 5, wherein the calculation unit outputs the central coordinates of the two points instead of the coordinates of the two points if at least one of the first and second inter-coordinates distances is smaller than a predetermined threshold.

9. A control method which controls a touch panel comprising a first resistive film comprising a first terminal and a second terminal on respective opposite end sides and a second resistive film comprising a third terminal and a fourth terminal on respective opposite end sides which are orthogonal to the opposite end sides of the first resistive film, the first and second resistive films being laid on top of each other with a gap between the resistive films in such a manner that the resistive films come into contact with each other at a point at which the touch panel has been touched, the method comprising:
applying a voltage between the first terminal and the second terminal at a first timing;
measuring a voltage of each of the third and fourth terminals at the first timing;
deriving a relative positional relationship between two points at which the touch panel has been touched based on the voltages of the third and fourth terminals measured at the first timing, wherein
the relative positional relationship includes a first relationship in which a straight line joining coordinates of the two points slopes upwards when going from left to right and a second relationship in which the straight line joining the coordinates of the two points slopes downwards when going from left to right, and
the relative positional relationship between the two points is derived based on a magnitude relationship between the voltages of the third and fourth terminals measured at the first timing;
applying a voltage between the third terminal and the fourth terminal at a second timing;
measuring the voltage of at least one of the first and second terminals at the first timing, and measuring the voltage of at least one of the third and fourth terminals, the voltage of the first terminal, and the voltage of the second terminal at the second timing; and
calculating central coordinates of the two points and at least one of a first inter-coordinates distance between the two points and a second inter-coordinates distance between the central coordinates and each of the two points, based on the voltages of the terminals measured at the first and second timings, and calculating the coordinates of the two points based on the central coordinates of the two points, at least one of the first and second inter-coordinates distances, and the relative positional relationship between the two points.

10. The method according to claim 9, wherein the central coordinates are calculated based on the voltages of the third and fourth terminals measured at the first timing and the voltages of the first and second terminals measured at the second timing.

11. The method according to claim 9, wherein at least one of the first and second inter-coordinates distances is calculated based on at least one of the voltages of the first and second terminals measured at the first timing and at least one of the voltages of the third and fourth terminals measured at the second timing.

* * * * *